United States Patent
Filsfils et al.

(10) Patent No.: US 8,892,772 B1
(45) Date of Patent: Nov. 18, 2014

(54) LIMITING CANDIDATE ROUTING BACKUP PATHS BASED ON POLICY CONSIDERATIONS

(75) Inventors: Clarence Filsfils, Brussels (BE); Klaus Martini, Ludwigsburg (DE); Deepak Sreekantan, San Jose, CA (US); Ian Michael Charles Shand, Cobham (GB)

(73) Assignee: Cisco Technology, Inc., San Jose, CA (US)

( * ) Notice: Subject to any disclaimer, the term of this patent is extended or adjusted under 35 U.S.C. 154(b) by 117 days.

(21) Appl. No.: 13/152,411

(22) Filed: Jun. 3, 2011

(51) Int. Cl.
*G06F 15/173* (2006.01)

(52) U.S. Cl.
USPC .......................................... 709/239; 709/238

(58) Field of Classification Search
CPC ............................... H04L 45/18; H04L 45/22
USPC .................................................. 709/239, 238
See application file for complete search history.

(56) References Cited

U.S. PATENT DOCUMENTS

| | | | |
|---|---|---|---|
| 7,826,369 B2 | 11/2010 | Filsfils et al. | |
| 8,165,121 B1 * | 4/2012 | Singh | 370/389 |
| 2004/0039839 A1 * | 2/2004 | Kalyanaraman et al. | 709/238 |

OTHER PUBLICATIONS

Atlas, et al., "Basic Specification for IP Fast Reroute: Loop-Free Alternates," Sep. 2008, RFC 5286, 5286, The Internet Society, Reston, VA, USA (thirty-one pages).
Filsfils et al., "LFA applicability in SP networks," Mar. 1, 2010, draft-filsfils-rtgwg-lfa-applicability-00, The Internet Society, Reston, VA, USA (twenty-eight pages).
"Understanding and Deploying Loop-free Alternative Featrue: Theoretical Overview and Operational Examples of Loop-Free Alternates in the Junos OS," Dec. 2009, Juniper Networks, Inc., Sunnyvale, CA, USA (twenty pages).

* cited by examiner

*Primary Examiner* — Kenneth Coulter
(74) *Attorney, Agent, or Firm* — The Law Office of Kirk D. Williams

(57) ABSTRACT

In one embodiment, candidate routing backup paths are limited based on policy considerations. In one embodiment, a smaller plurality of next-hop candidates is established by policy filtering a plurality of next-hop candidates for backing up one or more routes over one or more links to a first packet switching device in a network, with the smaller plurality of next-hop candidates consisting of fewer next-hops than in the plurality of next-hop candidates. A shortest-path, loop free backup route is determined for each of the plurality of routes by considering each of the smaller plurality of next-hop candidates and not all of the plurality of next-hop candidates. This routing information corresponding to each of said determined shortest-path, loop free backup routes for use in backing up corresponding routes is installed in a routing data structure.

20 Claims, 5 Drawing Sheets

LIMITING CANDIDATE ROUTING BACKUP PATHS BASED ON POLICY CONSIDERATIONS

TECHNICAL FIELD

The present disclosure relates generally to communicating information in a network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Routers exchange information in a network in order to determine how to forward packets to their respective destinations. The routers install this primary path routing information in forwarding data structures, and then retrieve it based on the destination address of a packet. However, the topology of a network is typically dynamic. Therefore, different paths through the network become available and unavailable. Rather than delaying until the routing in a network converges which may take a long time, routers often also install in the routing data structure routing information for a backup path for immediate use once the router detects a link or adjacent node failure.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Figure 1A:
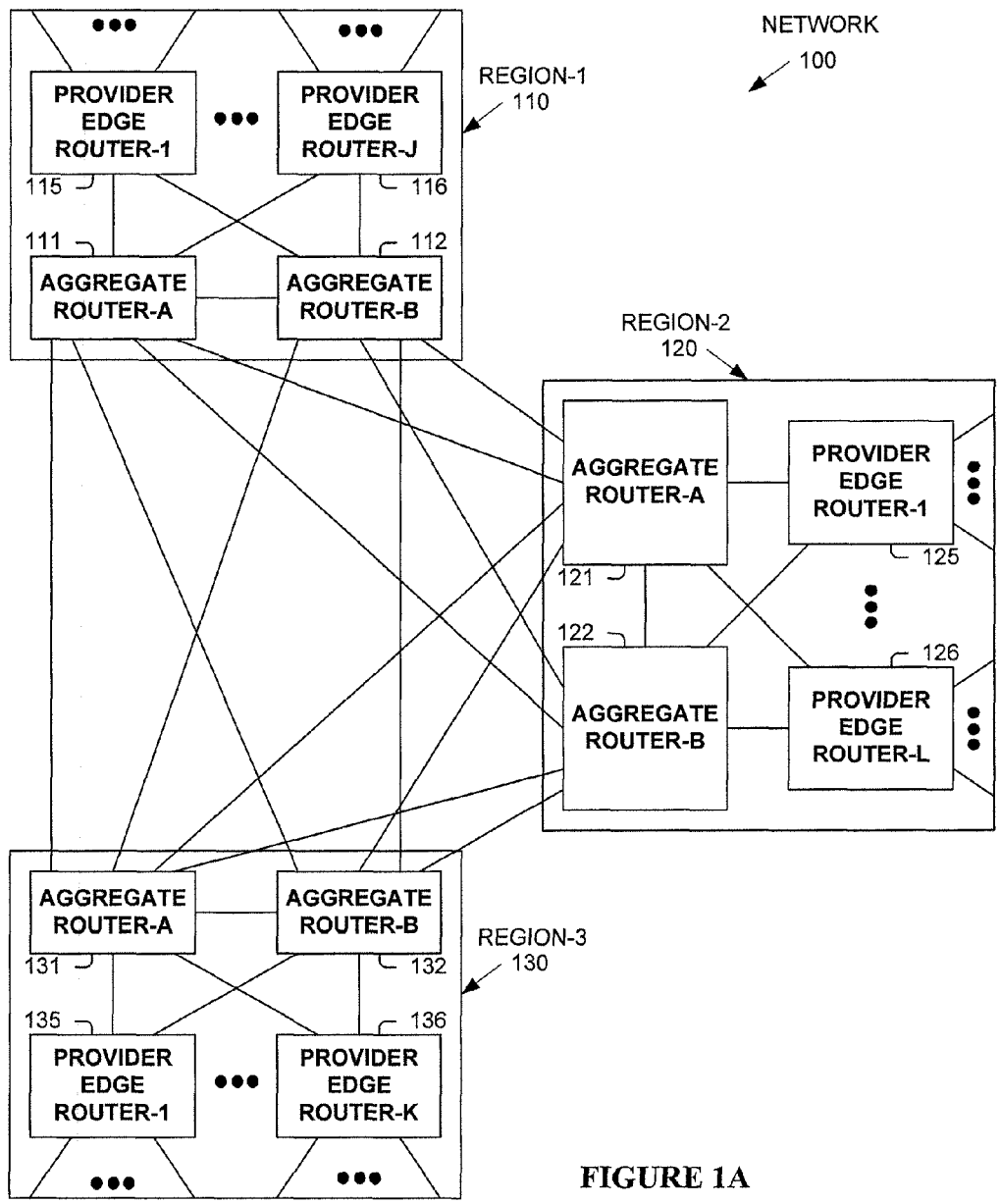
FIG. 1A illustrates a network operating according to one embodiment.

Disclosed are, inter alia, methods, apparatus, computer-storage media, mechanisms, and means associated with limiting candidate routing backup paths based on policy considerations. One embodiment includes a packet switching device, such as, but not limited to, a router or a bridge. In one embodiment, a smaller plurality of next-hop candidates is established by policy filtering a plurality of next-hop candidates for backing up a plurality of routes over one or more links to a first packet switching device in a network, with the smaller plurality of next-hop candidates consisting of fewer next-hops than in the plurality of next-hop candidates. A shortest-path, loop free backup route is determined for each of the plurality of routes by considering each of the smaller plurality of next-hop candidates and not all of the plurality of next-hop candidates. This routing information corresponding to each of said determined shortest-path, loop free backup routes for use in backing up corresponding routes of the plurality of routes is installed in a routing data structure.

In one embodiment, said determination of a shortest-path, loop free backup route for each of the plurality of routes includes calculating, from the perspective of each of the smaller plurality of next-hop candidates, routing information for each of the plurality of routes.

In one embodiment, the first packet switching device is identified as performing a first architectural role; wherein each of one or more particular next-hops of the plurality of next-hop candidates is identified as performing a second architectural role; and wherein said policy filtering of the plurality of next-hop candidates includes: excluding said each particular next-hop of said one or more particular next-hops from being in the smaller plurality of next-hop candidates based on said identification of the first packet switching device performing the first architectural role and said identification of said particular next-hop performing the second architectural role. In one embodiment, the first and second architectural roles are the same. In one embodiment, each of the first and second architectural roles includes being an edge router. In one embodiment, the architectural role(s) of routers are distributed via a routing protocol. In one embodiment, certain network nodes advertise in a routing protocol that another packet switching device should not consider them as a backup path, which does not disqualify the node from being on the primary path. In one embodiment, the physical location of nodes is considered in determining the backup paths. In one embodiment, a trust or security level of neighboring nodes or links to neighboring nodes is considered in determining the backup paths.

2. Description

Disclosed are, inter alia, methods, apparatus, computer-storage media, mechanisms, and means associated with limiting candidate routing backup paths based on policy considerations. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. A processing element may be a general processor, task-specific processor, or other implementation for performing the corresponding processing. The embodiments described hereinafter embody various aspects and configurations, with the figures illustrating exemplary and non-limiting configurations. Note, computer-readable media and means for performing methods and processing block operations (e.g., a processor and memory or other apparatus configured to perform such operations) are disclosed and are in keeping with the extensible scope and spirit of the embodiments. Note, the term "apparatus" is used consistently herein with its common definition of an appliance or device.

Note, the steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

Expressly turning to the figures, FIG. 1A illustrates a network 100 having three physically different regions 110, 120, 130. As known to one skilled in the art, edge routers are at the edge of a network, connecting the network to another network (e.g., especially a customer's network) as indicated by the shown links. Aggregate routers aggregate traffic from multiple devices, especially edge routers in a provider network.

Within region 110 are aggregate routers 111-112 and some number of provider edge routers 115-116, with edge routers 115-116 and aggregate routers 111-112 communicatively coupled as shown. Within region 120 are aggregate routers 121-122 and some number of provider edge routers 125-126, with edge routers 125-126 and aggregate routers 121-122 communicatively coupled as shown. Within region 130 are aggregate routers 131-132 and some number of provider edge routers 135-136, with edge routers 135-136 and aggregate routers 131-132 communicatively coupled as shown. Also as shown, aggregate routers 111-112, 121-122, and 131-132 are communicatively coupled in a fully-connected mesh arrangement.

Network 100 illustrates an example of a typical configuration of a service provider's network. For example, region-1 110 could be in Los Angeles, region-2 120 could be in Chicago, and region-3 130 could be in New York.

Figure 1B:
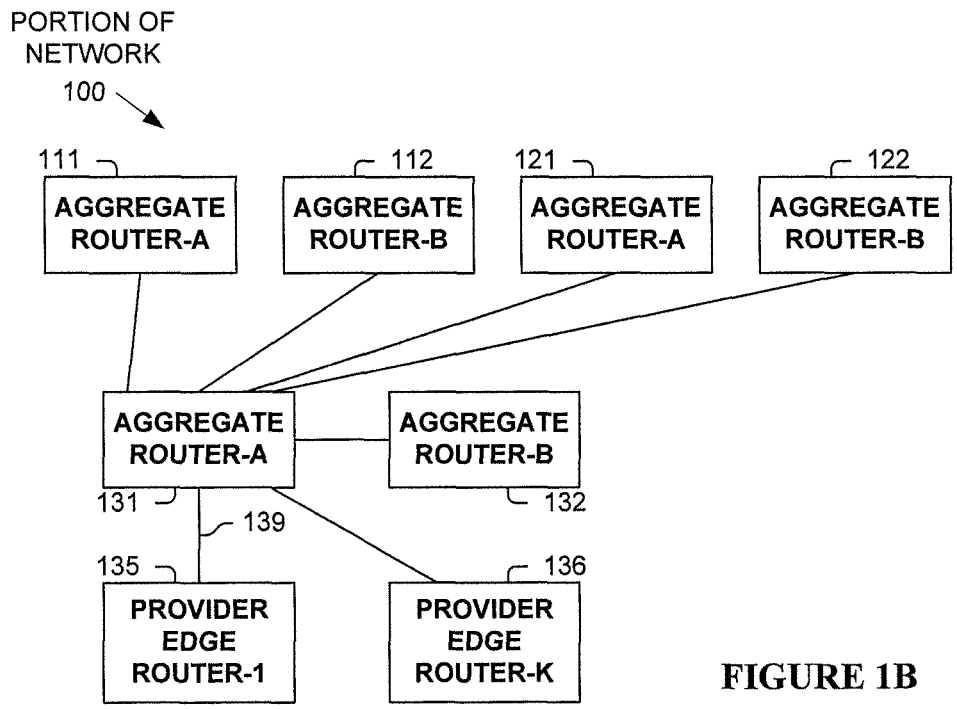
FIG. 1B illustrates a network operating according to one embodiment.

FIG. 1B illustrates a portion of network 100, which will be used to illustrate router 131 selecting to backup routes whose primary paths going over link 139 between itself and edge router 135. Note, a "route" is an address, either fully expanded or a prefix. A router typically performs a longest prefix match against routes in a routing database. Further, routes are typically associated, in the routing database, with forwarding information typically including an interface and next-hop address. The forwarding information identified by a lookup operation in a routing data base (e.g., Router Information Base or RIB, Forwarding Information Base or FIB) identifies forwarding information which instructs the router from which of its interfaces to forward the packet and the identification of the neighboring router or next-hop.

Prior systems typically would perform a loop-free alternative calculation by considering all neighboring routers. Therefore, the prior router would compute the routing tables of each neighboring nodes for each route, and from there, determine a loop-free alternative backup path for each route. For example, assume a node in a provider's network has 280 neighboring nodes and is concerned with 1000 Intermediate System-to-Intermediate System (IS-IS) prefixes. Therefore, every time the network configuration changed, the router would perform 280,000 (280×1000) Per-Prefix Loop-Free Alternative calculations.

As shown, router 131 has seven neighboring routers 111, 112, 121, 122, 132, 135 and 136. Thus, there are six neighboring routers 111, 112, 121, 122, 132, and 136 which are candidates for backing up routes configured for forwarding traffic to edge router 135 over communications link 139. Rather than determining a backup path through any one of the six candidate next-hops (111, 112, 121, 122, 132, and 136), one embodiment first filters the candidate next-hops to a smaller set of next-hops based on policy considerations.

Examples of such policy considerations include, but are not limited to, architectural function of a router, region, willingness to be a backup, security or trust level. For example, one policy is not to backup an edge router via another edge router. For example, certain communication links coupled to a packet switching device might be described in relation to various security or trust levels based on various factors (e.g., non-terrestrial communication, path of the communications links to which it is attached, autonomous system to which it belongs, etc.).

In the portion of example network 100 shown in FIG. 1B, such policy consideration removes edge routers 135-136, which may mean removing hundreds of neighboring nodes from consideration. In one embodiment, only potential next-hops within a same region are considered. Referring to FIG. 1A, this would mean that roughly two-thirds of the routers in network 100 would be considered. One embodiment has a policy that is not to backup an edge router via another edge router and only consider next-hops within a same region. Therefore, referring to FIGS. 1A-B, the only candidate for backing up routes over link 139 to edge router 135 would be via aggregate router 132. Thus, filtering candidate next-hop routers based on policy considerations can reduce the number of calculations required to determine backup paths in a network (e.g., also reducing the time and resources required for performing these calculations).

Figure 2:
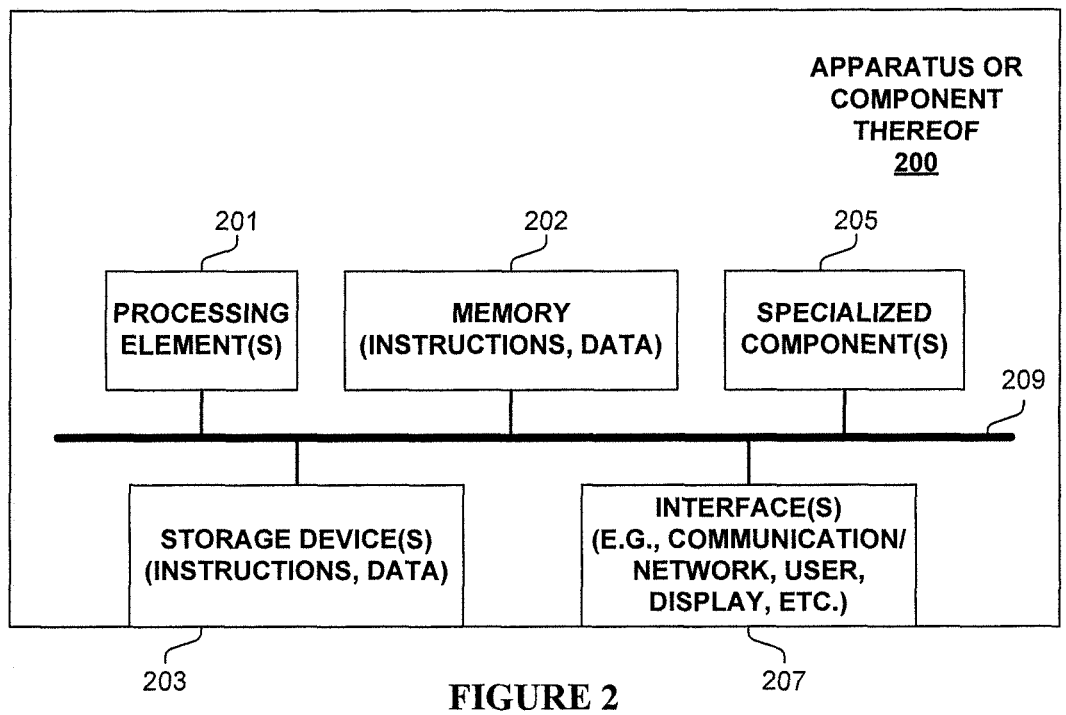
FIG. 2 illustrates an apparatus or component used in one embodiment.

FIG. 2 is block diagram of an apparatus or component 200 used in one embodiment associated with limiting candidate routing backup paths based on policy considerations. In one embodiment, apparatus or component 200 performs one or more processes corresponding to one of the flow diagrams illustrated or otherwise described herein.

In one embodiment, apparatus or component 200 includes one or more processing element(s) 201, memory 202, storage device(s) 203, specialized component(s) 205 (e.g. optimized hardware such as for performing filtering and/or backup route calculation operations, etc.), and interface(s) 207 for communicating information (e.g., sending and receiving packets, user-interfaces, displaying information, etc.), which are typically communicatively coupled via one or more communications mechanisms 209, with the communications paths typically tailored to meet the needs of the application. In one embodiment apparatus or component 200 corresponds to, or is part of, a router illustrated in FIG. 1A.

Various embodiments of apparatus or component 200 may include more or less elements. The operation of apparatus or component 200 is typically controlled by processing element(s) 201 using memory 202 and storage device(s) 203 to perform one or more tasks or processes. Memory 202 is one type of computer-readable/computer-storage medium, and typically comprises random access memory (RAM), read only memory (ROM), flash memory, integrated circuits, and/or other memory components. Memory 202 typically stores computer-executable instructions to be executed by processing element(s) 201 and/or data which is manipulated by processing element(s) 201 for implementing functionality in accordance with an embodiment. Storage device(s) 203 are another type of computer-readable medium, and typically comprise solid state storage media, disk drives, diskettes, networked services, tape drives, and other storage devices. Storage device(s) 203 typically store computer-executable instructions to be executed by processing element(s) 201 and/or data which is manipulated by processing element(s) 201 for implementing functionality in accordance with an embodiment.

Figure 3:
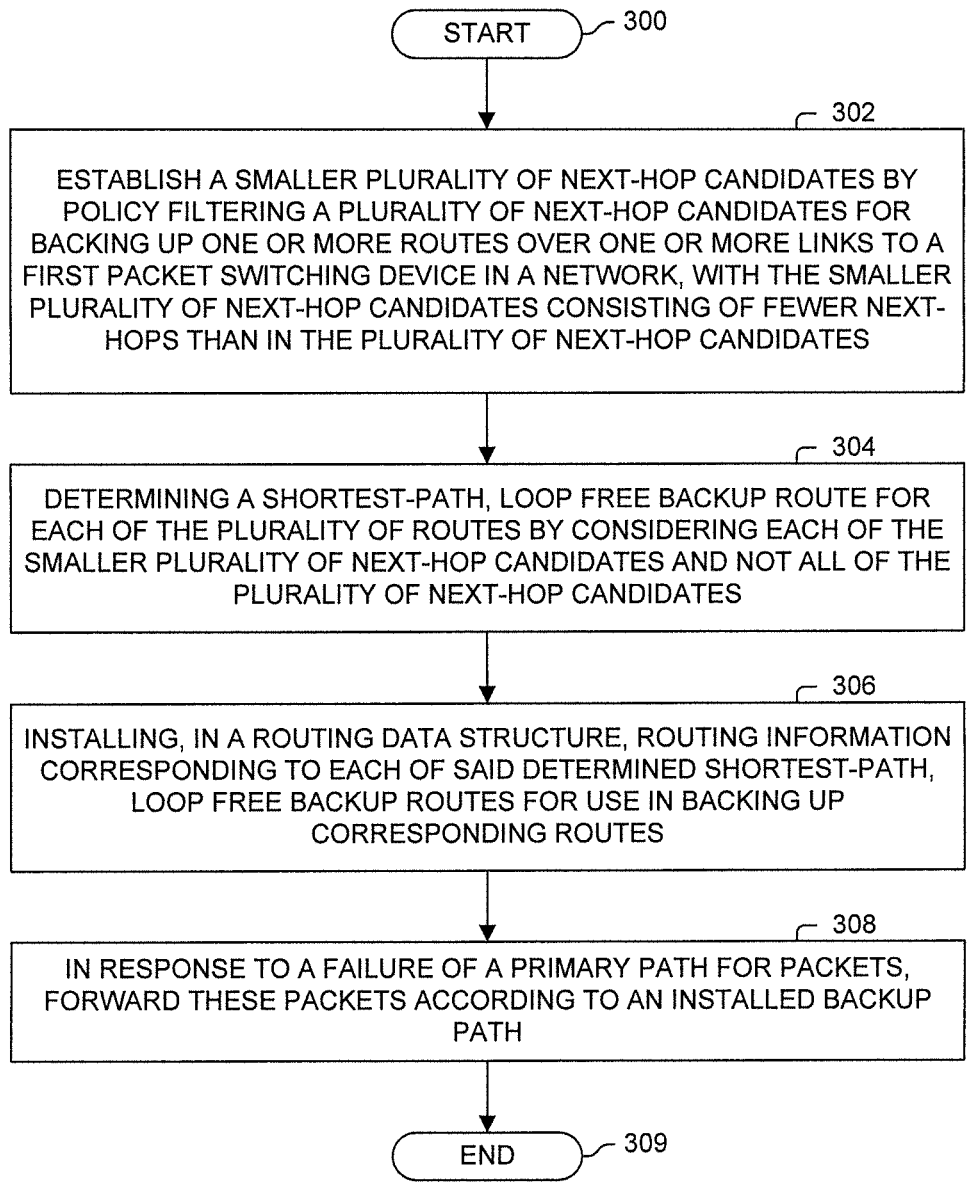
FIG. 3 illustrates a process performed in one embodiment.

FIG. 3 illustrates a process performed in one embodiment. Processing begins with process block 300. In process block 302, a smaller plurality of next-hop candidates is established by a packet switching device by policy filtering a plurality of next-hop candidates for backing up one or more routes over one or more links to a first packet switching device in a network, with the smaller plurality of next-hop candidates consisting of fewer next-hops than in the plurality of next-hop candidates. In process block 304, a shortest-path, loop-free backup route for each of the plurality of routes is determined by considering each of the smaller plurality of next-hop candidates and not all of the plurality of next-hop candidates. In process block 306, routing information corresponding to each of said determined shortest-path, loop-free backup routes is installed in a routing database (e.g., RIB, FIB) for use in backing up corresponding routes. In process block 308, in response to a failure of a primary path for packet (e.g., the corresponding next-hop device, or link to the corresponding next-hop device), packets are forwarded according to the corresponding installed backup path information. Processing of the flow diagram of FIG. 3 is complete as indicated by process block 309.

Figure 4:
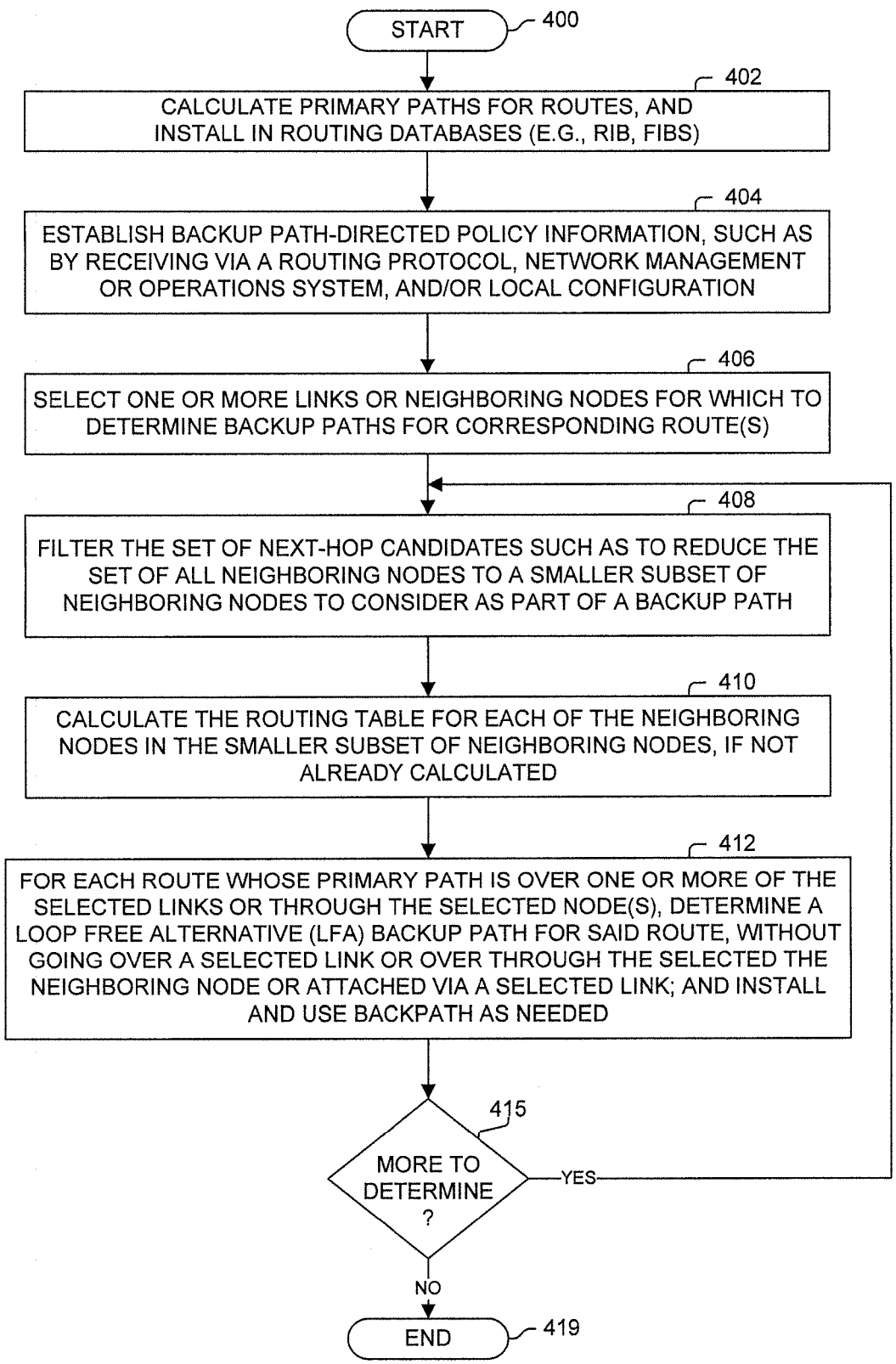
FIG. 4 illustrates a process performed in one embodiment.

FIG. 4 illustrates a process performed in one embodiment. Processing begins with process block 400.

In process block 402, wherein primary paths for routes are calculated and installed in one or more routing databases (e.g., RIB, FIB). In process block 404, backup path-directed policy information is established, such as receiving via a routing protocol, network management or operations system and/or local configuration (e.g., via a console).

Figure 5:
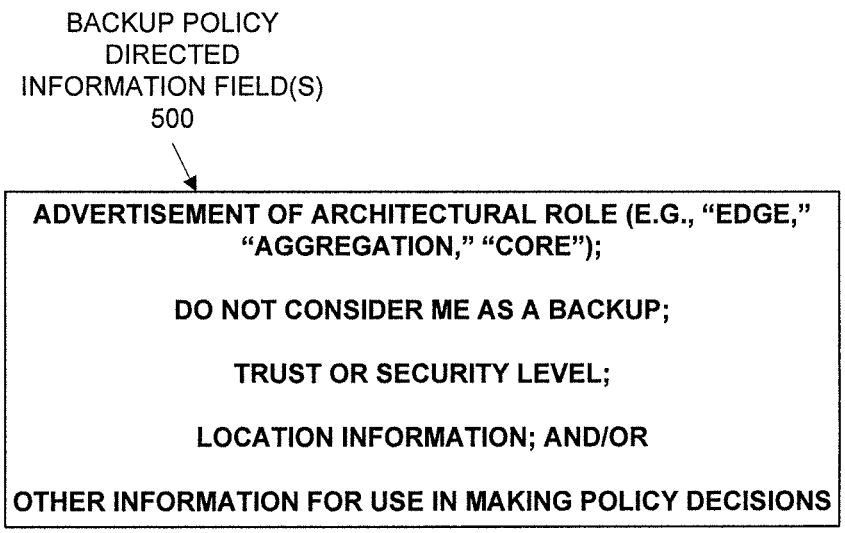
FIG. 5 illustrates information communicated via a routing protocol in one embodiment.

Turning to FIG. 5, illustrated is an example of policy information communicated via a routing protocol (or alternatively, communicated via a network management or operations system, or locally configured). For example, an IS-IS or other routing protocol packet may include one or more backup policy directed information fields 500 describing information to be used by a packet switching device in filtering potential next-hops, or certain links to potential next-hops. Note, a packet switching device may be connected to another packet switching device via multiple communications links. There may be situations in which only certain of these links should be considered as a possible backup path.

In one embodiment, a packet switching device advertises information about itself in one or more backup policy directed information fields 500, which then can be used by a packet switching device determining backup routes. In one embodiment such information includes, but is not limited to the architectural role (e.g., edge, aggregate, core, etc.) of the advertising packet switching device; whether or not to consider the advertising packet switching device as a potential next-hop on a backup path; a trust or security level of the advertising packet switching device or links to which it communicates packets; location information of the advertising packet switching device; and/or any other information related to the advertising packet switching device based on which another packet switching device can make backup routing decisions.

Returning to the processing of FIG. 4, in process block 406, one or more links or neighboring nodes are selected for having backup routes determined for those routes whose primary path traverses these link(s) or node(s). In process block 408, the set of next-hop candidates are filtered such as to reduce the set of all neighboring nodes to a smaller subset of neighboring nodes to consider as part of a packet path. In process block 410, the routing table is calculated, if not already calculated, for each of the neighboring nodes in the smaller subset of neighboring nodes. In process block 412, for each route whose primary path is over one or more of the selected links or through the selected node(s), a Loop-Free Alternative (LFA) or other backup path is determined for the route (e.g., that does not traverse the selected link(s) or node(s)). This backup path information is installed in one or more routing databases for the route, and used for forwarding packets as needed. As determined in process block 415, if there are more links or neighboring nodes on a primary path of one or more routes for which backup path information needs to be calculated, then processing returns to process block 408. Otherwise, processing of the flow diagram of FIG. 4 is complete at indicated by process block 419.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method performed by a packet switching device, with the method comprising:

establishing a smaller plurality of next-hop candidates based on architectural role policy filtering a plurality of next-hop candidates for backing up a plurality of routes over one or more links to a first packet switching device in a network, with the smaller plurality of next-hop candidates consisting of fewer next-hops than in the plurality of next-hop candidates;

determining a shortest-path, loop free backup route for each of the plurality of routes by considering each of the smaller plurality of next-hop candidates and not all of the plurality of next-hop candidates; and installing, in a routing data structure, routing information corresponding to each of said determined shortest-path, loop free backup routes for use in backing up corresponding routes of the plurality of routes.

2. The method of claim 1, wherein said determining a shortest-path, loop free backup route for each of the plurality of routes includes calculating, from the perspective of each of the smaller plurality of next-hop candidates, routing information for each of the plurality of routes.

3. The method of claim 1, including routing packets according to routing information in the routing data structure, which includes routing one or more packets according to one of said determined shortest-path, loop free backup routes.

4. The method of claim 1, comprising: receiving, via a routing protocol from one or more other appliances in the network, policy information specifying that said one or more particular next-hops are not to be considered as a backup candidate; and wherein said policy filtering of the plurality of next-hop candidates includes: excluding each particular next-hop of said one or more particular next-hops from being in the smaller plurality of next-hop candidates based on said identification that said particular next-hop is said not to be considered as a backup candidate.

5. The method of claim 4, wherein each said particular next-hop of said one or more particular next-hops advertises, via the routing protocol, from being in the smaller plurality of next-hop candidates based on said identification that said particular next-hop is said not to be considered as a backup candidate.

6. The method of claim 1, wherein said policy filtering of the plurality of next-hop candidates includes: excluding said each particular next-hop of said one or more particular next-hops from being in the smaller plurality of next-hop candidates based on an identification of the absolute physical locations of the particular packet switching device and said particular next-hop.

7. The method of claim 1, wherein said policy filtering of the plurality of next-hop candidates includes: excluding said each particular next-hop of said one or more particular next-hops from being in the smaller plurality of next-hop candidates based on an identification of a trust or security level of said particular next-hop.

8. The method of claim 1, wherein a next-hop candidate of plurality of next-hop candidates corresponds to a neighboring node and a communications path from the particular packet switching device to the neighboring node.

9. The method of claim 8, wherein the plurality of next-hop candidates in the network includes: a first communications path to a first neighboring node in the network, and a second communications path to the first neighboring node; and wherein the smaller plurality of next-hop candidates includes the first communications path to the first neighboring node, but not the second communications path to the first neighboring node.

10. The method of claim 9, wherein the first communications path is identified with a first security or trust level, and the second communications path is identified with a second security or trust level different than the first security or trust level; and wherein said policy filtering of the plurality of next-hop candidates comprises: excluding said next-hop identified by the second communications path to the first neighboring node based on the second security or trust level, and including said next-hop identified by the first communications path to the first neighboring node based on the first security or trust level.

11. The method of claim 8, wherein a communications path is identified by an interface of the particular packet switching device coupled to a link between the particular packet switching device and a neighboring node, or a communications path is identified by a link between the particular packet switching device and a neighboring node.

12. A method performed by a packet switching device, with the method comprising:

establishing a smaller plurality of next-hop candidates based on architecture role policy a plurality of next-hop candidates for backing up a plurality of routes over one or more links to a first packet switching device in a network, with the smaller plurality of next-hop candidates consisting of fewer next-hops than in the plurality of next-hop candidates;

determining a shortest-path, loop free backup route for each of the plurality of routes by considering each of the smaller plurality of next-hop candidates and not all of the plurality of next-hop candidates; and installing, in a routing data structure, routing information corresponding to each of said determined shortest-path, loop free backup routes for use in backing up corresponding routes of the plurality of routes;

wherein the first packet switching device is identified as performing a first architectural role;

wherein each of one or more particular next-hops of the plurality of next-hop candidates is identified as performing a second architectural role; and wherein said policy filtering of the plurality of next-hop candidates includes: excluding said each particular next-hop of said one or more particular next-hops from being in the smaller plurality of next-hop candidates based on said identification of the first packet switching device performing the first architectural role and said identification of said particular next-hop performing the second architectural role.

13. The method of claim 12, wherein the first and second architectural roles are the same.

14. The method of claim 12, wherein each of the first and second architectural roles includes being an edge router.

15. The method of claim 12, comprising: receiving, via a routing protocol from one or more other appliances in the network, router architectural information that the architectural role of each of said one or more particular next-hops includes said performing the second architectural role.

16. An apparatus, comprising:

a plurality of interfaces configured for sending and receiving packets with other devices in a network; and one or more processing mechanisms configured for maintaining routing information in the apparatus for use in forwarding packets;

wherein said maintaining routing information includes:

establishing a smaller plurality of next-hop candidates based on architectural role policy filtering a plurality of next-hop candidates for backing up one or more routes over one or more links to a first packet switching device in a network, with the smaller plurality of next-hop candidates consisting of fewer next-hops than in the plurality of next-hop candidates;

determining a shortest-path, loop free backup route for each of said one or more routes by considering each of the smaller plurality of next-hop candidates and not all of the plurality of next-hop candidates; and installing, in a routing data structure, routing information corresponding to each of said determined shortest-path, loop free backup routes for use in backing up corresponding routes of said one or more routes.

17. The apparatus of claim 16, wherein said determining a shortest-path, loop free backup route for each of said one or more routes includes calculating, from the perspective of each of the smaller plurality of next-hop candidates, shortest-path routing information for each of said one or more routes.

18. The apparatus of claim 16, wherein the first packet switching device is identified as performing a first architectural role;

wherein each of one or more particular next-hops of the plurality of next-hop candidates is identified as performing a second architectural role; and wherein said policy filtering of the plurality of next-hop candidates includes: excluding said each particular next-hop of said one or more particular next-hops from being in the smaller plurality of next-hop candidates based on said identification of the first packet switching device performing the first architectural role and said identification of said particular next-hop performing the second architectural role.

19. The apparatus of claim 18, wherein said maintaining routing information includes: receiving, via a routing protocol from one or more other appliances in the network, router architectural information that the architectural role of each of said one or more particular next-hops includes said performing the second architectural role.

20. The apparatus of claim 16, wherein a next-hop candidate of plurality of next-hop candidates corresponds to a neighboring node and a communications path from the particular packet switching device to the neighboring node.

* * * * *